United States Patent Office

3,344,110
Patented Sept. 26, 1967

3,344,110
POLYVINYL CHLORIDE STABILIZED BY SILAZANES
Nathaniel Willis, Chicago, Ill., assignor, by mesne assignments, to Dow Corning Corporation, Midland, Mich., a corporation of Michigan
No Drawing. Filed Jan. 11, 1963, Ser. No. 250,757
3 Claims. (Cl. 260—45.9)

This invention relates to stabilized plastics compositions and method for their stabilization against photodegradation and more particularly relates to stabilization of plasticized polyvinylchloride and method for obtaining such stabilization.

The many efforts being made to increase the number of uses of plastics in the construction industry have been confronted by the fact that plastics in general are subject to photodegradation both in sunlight and in indoor fluorescent lighting, this photodegradation being caused by ultraviolet light in particular. Especially susceptible to such degradation and associated chemical changes is polyvinylchloride and, accordingly, it has received extensive study and consideration directed toward making it an acceptable material in construction applications.

Although degradation is generally acknowledged to be due to the action of ultraviolet light, the intermediate effect is presumably a dehalogenation within the vinylchloride polymer. In turn, this may provide a starting point for oxidation of the polymer itself with chemical effects extending to the plasticizers or colorants included in the polymer formulation.

Regardless of the specific effect on any one constituent, the total effect of exposing plasticized polyvinylchloride to light for prolonged periods is generally a combination of spotting and related discloration with eventual loss of physical properties as evidenced by brittleness, for example.

Accordingly, it is the purpose of this invention to provide a means for minimizing degradation and deterioration of plasticized polyvinylchloride.

A further object is to extend the applications of plasticized polyvinylchloride in the construction industry.

These and other related objects are achieved by this invention wherein by incorporation of silazanes in the vinyl formulation the polyvinylchloride itself is stabilized and attendant deterioration of plasticizers, colorants and other additives is diminished. Specifically, it has been found that light stabilization of plasticized polyvinylchloride is achieved by the inclusion in the polyvinylchloride formulation of small amounts of the reaction product of ammonia and a mixture of from about 20 to about 80 molar percent of a halosilane having the formula $R_2SiHal_2$ and the balance of said mixture being a halosilane having the formula $RSiHal_3$ in which formulae Hal is a member of the halogen group and R is a member of the group consisting of hydrogen, lower alkyl, lower alkenyl and aryl.

Processes for ammonolysis of halosilanes are set forth in various patents such as U.S. 2,462,635 to Haber and U.S. 2,579,417 and 2,579,418, both to Cheronis. Ammonolysis is conducted at temperatures near 0° C. in the absence of water and in the presence of an inert solvent such as methylene chloride, the ammonia becoming an amino substituent replacing one or more of the halogen substituents on the silicon atom of the halosilane.

By ammonolysis of such a mixture of halosilanes, a variety of reaction products are possible but all can be categorized as silazanes. With a trihalosilane, ammonolysis is presumed to favor the formation of a silazane containing structures crosslinked at the silicon atoms through the amine substituent while the ammonolysis of a dihalosilane is believed to tend toward the development of cyclics containing alternating silicon-nitrogen linkages. Accordingly, beginning with a mixture of the di- and trihalosilanes these reactions plus other further reactions between the otherwise separate products yield resinous polymers which are essentially but not precisely reproducible but which do have in common the repeating silicon-nitrogen linkages.

Halosilanes to be preferred for the practice of this invention are the chlorosilanes, these being the least expensive and therefore most readily available. In general, the dichlorosilanes upon being ammonolyzed yield polymeric reaction products with the characteristics of an oily liquid, these products being very stable at room temperature and above, due at least in part to the difunctionality established in the original silane by the two chlorine substituents and retained in the form of amine substituents following ammonolysis. Conversely, many of the trihalosilanes have a functionality when ammonolyzed that is so high as to produce very viscous polymers in both liquid and solid forms even at room temperature.

A silazane reaction product with a functionality below about 2.2 (about 80 percent difunctional silazane based on the original dichlorosilane) will be too non-reactive in the applications to be described. Above a functionality of about 2.8 (about 80 percent trifunctional silazane based on the original trichlorosilane) the silazane reaction product will be so reactive as to react with itself and be either solid or so viscous as to be relatively insoluble and therefore unmanageable and unreactive in the manner required for the purposes of this invention. Therefore, mixtures of both di- and trichlorosilanes are the contemplated starting material for ammonolysis to produce the reaction products to be used in the practice of the invention.

Ammonolysis of a mixture is carried out at reduced temperatures in the same manner as ammonolysis of a single halosilane using either liquid or gaseous ammonia according to methods set forth in the aforementioned patents.

The following description and examples further illustrate procedures and reaction products having applications for the purposes of this invention.

EXAMPLE I

Into a dry reactor 230 pounds of methylene chloride are introduced as solvent for 13.5 pounds of methyltrichlorosilane and 2.9 pounds of dimethyldichlorosilane, this constituting a mixture of the two halosilanes in a molar ratio of 4 to 1, respectively. The reactor is closed, swept with nitrogen and the contents cooled to 0° C. before introducing gaseous ammonia below the liquid surface. Nine pounds of ammonia are added continuously for 98 minutes, the temperature rising during the reaction and then falling, as the end point approaches. The mixture is heated to 25° C., filtered to remove the by-product ammonium chloride, and the solvent is then removed by distillation. Analysis of the product showed 21.72% C, 8.01% H, 27.40% N, 40.80% Si, 0.08% Cl, the product being yellow-white crystals.

EXAMPLE II

Using the same ingredients in an equimolar mixture and the same method as set forth in Example I produced a clear, faintly yellow, low viscosity, liquid; $d$ 1.070 and $n_D^{25}$ 1.4897.

EXAMPLE III

Seven molar parts of vinyltrichlorosilane and 5 molar parts of methylphenyldichlorosilane reacted with gaseous ammonia in the manner of Example I yielded a light yellow liquid with viscosity greater than Z–6; $d$ 1.176 and $n_D^{25}$ 1.5756.

EXAMPLE IV

Equimolar amounts of the ingredients in Example III reacted in the same manner with ammonia produced a very viscous hazy yellow liquid with $d$ 1.143 and $n_D^{25}$ 1.5782 and the same ingredients in molar ratios of 5 to 6, respectively, when subjected to ammonolysis gave a cloudy liquid having a viscosity of Z–6, $n_D^{25}$ 1.5722, $d$ 1.136.

EXAMPLE V

Four molar parts of ethyltrichlorosilane and 1 molar part of dimethyldichlorosilane when ammonolyzed according to the foregoing procedure produced a viscous, opaque liquid, $d$ 1.110 and $n_D^{25}$ 1.5081.

EXAMPLE VI

Equimolar portions of allyltrichlorosilane and dimethyldichlorosilane upon ammonolysis gave a light but cloudy liquid with $d$ 1.043 and $n_D^{25}$ 1.5021.

Other specific formulations made for use in the practice of this invention included dimethyldichlorosilane and vinyltrichlorosilane in molar ratios of the two constituents of 1 to 2 and 3 to 5, respectively, and methyltrichlorosilane in equimolar mixes with either diphenyldichlorosilane, methylvinyldichlorosilane or methyldichlorosilane. Vinyltrichlorosilane was combined with methylvinyldichlorosilane as well as with diphenyldichlorosilane, both combinations being in molar ratios of 5 mols of vinyltrichlorosilane to 6 mols of each of the other constituents. Trichlorosilane in equimolar proportions with either methyldichlorosilane or dimethyldichlorosilane was also subjected to ammonolysis. In the same equimolar proportions phenyltrichlorosilane was mixed with either dimethyldichlorosilane or diphenyldichlorosilane and ammonolyzed.

Results obtainable in stabilizing polyvinylchloride by the inclusion of the foregoing silazanes are demonstrated in the following formulations and by the comparison of their performance with both unmodified plasticized polyvinylchloride and plasticized polyvinylchloride containing other conventional ingredients such as fillers and pigments. When these latter were included, the plasticizer, filler and pigment were mixed before the polyvinylchloride was introduced into the mixer. All amounts are in parts by weight.

Formula I 100 parts of solution polymerized polyvinylchloride and 65 parts of dioctyl phthalate were blended into a smoth paste to serve as an unstabilized control.

Formula II 10 parts of a filler, 2 parts of titanium dioxide pigment and 65 parts of dioctyl phthalate were mixed and subsequently blended with 100 parts of the same polyvinylchloride employed in Formula I, this total formulation constituting a filled, pigmented, plasticized polyvinylchloride.

Formula III

With the same ingredients and proportions used in Formula II the modified polyvinylchloride resin was blended with the exception that the dioctyl phthalate was reduced to 55 parts and supplemented by 10 parts of an epoxy plasticizer.

To each of Formulas I, II and III above were added the above-described silazanes consisting of 2 parts and 4 parts of the reaction product of ammonia and mixture of di- and tri-functional halosilanes, either being present in the amount of from about 20 to about 80 molar percent, the amounts of these being in parts by weight per hundred parts of the polyvinylchloride resin portion of the formulae. Illustrative of the results to be obtained are those where 2 and 4 parts of the ammonolysis reaction product of Example II were used. For additional comparison the recommended level (3 parts per hundred of resin) of a commercially employed light stabilizer—a barium-cadmium stabilizer was included in the same three formulas.

After deaeration, each of the compositions were cast into films 20 mils in thickness, the resulting sheets being cut into 1″ x 1″ squares. Fadeometer testing of the squares employed a 275-watt sunlamp with the lamp bulbs being changed every 200 hours per ASTM 1148–35. Specimens were placed 10 inches from the ultraviolet light source on black construction paper functioning as a light absorber with the paper covering aluminum sheet used to disperse any localized heat build-up. Air circulation within the fadeometer was regulated so as to maintain a temperature of 135±5° F. and a relative humidity of 15±5%.

Light stability was evaluated in terms of hours to various stages of degradation, initial failure being associated with the first sign of gel spots or discoloration, intermediate failure being either brown spots or definite yellowing, and complete degradation or failure being either dark brown or black discoloration.

Results for the several formulas are found in Tables I, II and III, in which C represents Formula I, Formula II, and Formula III, respectively, as controls without stabilizer. FIGURES 1, 2 and 3 represent initial controls to which were added 2 parts per hundred of the composition of Example II, 4 parts per hundred of the composition of Example II, and 3 parts per hundred of the aforementioned barium-cadmium stabilizer.

TABLE I

| Failure | C | 1 | 2 | 3 |
|---|---|---|---|---|
| Initial | 288 | 984 | 1,848 | 336 |
| Intermediate | 696 | 1,608 | 2,280 | 1,608 |
| Complete | 984 | 2,400+ | 2,400+ | 2,400+ |

TABLE II

| Failure | C | 1 | 2 | 3 |
|---|---|---|---|---|
| Initial | 336 | 336 | 1,344 | 336 |
| Intermediate | 816 | 1,608 | 1,608 | 1,608 |
| Complete | 2,400+ | 2,400+ | 2,400+ | 2,400+ |

TABLE III

| Failure | C | 1 | 2 | 3 |
|---|---|---|---|---|
| Initial | 336 | 336 | 336 | 816+ |
| Intermediate | 816 | 1,608 | 1,608 | 1,608 |
| Complete | 2,400+ | 2,400+ | 2,400+ | 2,400+ |

In the case of clear polyvinylchloride (Table I) initial failure occurred in 288 hours, the barium-cadmium stabilizer extending initial failure to 336 hours and then silazane at both 2 and 4 parts per hundred parts of the polyvinylchloride resin being even far more effective. With the filled resin of Formula II (Table II) initial failure was the same for the unstabilized control, for the composition comprising 2 parts per hundred of the silazane and for the barium-cadmium stabilized composition. Superiority over the unstabilized resin in the case of Formula III was not evident until intermediate failure of the films was considered, at which point the silazanes performed as well as the barium-cadmium stabilizer.

Having thus described the invention, which is claimed is:

1. A composition comprising polyvinylchloride resin, a plasticizer for said resin and per 100 parts by weight of said resin from about 2 to about 4 parts by weight of the silazane reaction product of ammonia and a mixture of from about 20 to about 80 molar percent of a halosilane having the formula $R_2SiHal_2$ and the balance of said mixture being a halosilane having the formula $RSiHal_3$ in which formulae Hal is a member of the halogen group and R is selected from the group consisting of hydrogen, lower alkyl, lower alkenyl and aryl wherein the ammonia becomes an amino substituent replacing one or more of the halogen substituents on the silicon atom said reaction conducted at temperatures near 0° C. in an inert solvent.

2. A composition comprising polyvinylchloride resin, a plasticizer for said resin and per 100 parts by weight of said resin from about 2 to about 4 parts by weight of the silazane reaction product of ammonia and a mixture of from about 20 to about 80 molar percent of dimethyldichlorosilane and the balance of said mixture being methyltrichlorosilane wherein the ammonia becomes an amino substituent replacing one or more of the halogen substituents on the silicon atom said reaction conducted at temperatures near 0° C. in an inert solvent.

3. A composition comprising polyvinylchloride resin, a plasticizer for said resin and per 100 parts by weight of said resin from about 2 to about 4 parts by weight of the silazane reaction product of ammonia and an equimolar mixture of dimethyldichlorosilane and methyltrichlorosilane wherein the ammonia becomes an amino substituent replacing one or more of the halogen substituents on the silicon atom said reaction conducted at temperatures near 0° C. in an inert solvent.

References Cited

UNITED STATES PATENTS 2,579,418    12/1951    Cheronis _____ 260—30.6 X

DONALD E. CZAJA, *Primary Examiner.*

M. J. MELSH, *Assistant Examiner.*